United States Patent [19]

Martz et al.

[11] Patent Number: 4,979,232
[45] Date of Patent: Dec. 18, 1990

[54] SELF-BIASING SOLID-STATE T/R SWITCH

[75] Inventors: Donald R. Martz, Webster; Greg W. Bezjak, Rochester, both of N.Y.

[73] Assignee: Harris Corporation, Rochester, N.Y.

[21] Appl. No.: 393,653

[22] Filed: Aug. 14, 1989

[51] Int. Cl.$^5$ .............................................. H04B 1/44
[52] U.S. Cl. ........................................ 455/78; 455/83
[58] Field of Search ................... 455/78, 79, 82, 83, 455/217, 80-81; 333/101, 103, 104; 307/241-242, 256, 259; 370/32

[56] References Cited

U.S. PATENT DOCUMENTS

| | | | |
|---|---|---|---|
| 3,227,954 | 1/1966 | Fichter, Jr. ........................... | 455/82 |
| 4,055,807 | 10/1977 | Priniski et al. ........................ | 455/83 |
| 4,399,557 | 8/1983 | Muszkiewicz ........................ | 455/83 |
| 4,525,863 | 6/1985 | Stites ..................................... | 455/83 |
| 4,637,065 | 1/1987 | Ruppel .................................. | 455/83 |
| 4,641,365 | 2/1987 | Montini, Jr. .......................... | 455/83 |
| 4,677,688 | 6/1987 | Yoshihara et al. .................... | 455/83 |
| 4,853,972 | 8/1989 | Ueda et al. ............................ | 455/82 |

Primary Examiner—Reinhard J. Eisenzopf
Assistant Examiner—Andrew Faile
Attorney, Agent, or Firm—Rogers & Killeen

[57] ABSTRACT

A solid-state switch for coupling an antenna to either a transmitter or a receiver. The switch includes a pair of oppositely poled diodes and a low voltage power supply connected between the diodes for providing a forward biasing voltage to the diodes. Reverse biasing voltage to stop RF current flow through the diodes is provided by the RF signal itself by means of a voltage doubler. The same voltage doubler and a power detector reverse bias the receiver diode during overload conditions.

7 Claims, 2 Drawing Sheets

SELF-BIASING SOLID-STATE T/R SWITCH

BACKGROUND OF THE INVENTION

The present invention relates to switches for connecting an antenna to either a transmitter or a receiver. More particularly, it relates to a self-biased solid-state switch for coupling a radio frequency (RF) antenna with either a transmitter or a receiver in a communication system.

It has long been recognized that, in order to prevent damage to an RF receiver, the RF power from a transmitter should be prevented from reaching the receiver connected to the same antenna as the transmitter. Further, it is desirable that the receiver be decoupled from the antenna when an overload condition occurs, such as a power surge at the antenna.

Mechanical switches for performing these functions are either too slow or prone to failure. Electronic switches have been proposed, but their use has been limited by the amount of power they can switch.

Typically, electronic switches apply a reverse biasing voltage to a diode and thereby restrict the flow of the RF current from the transmitter to the receiver. To restrict the RF current flow, the reverse biasing voltage must at least be equal to the RF voltage. For low power transmitters, a typical low voltage power source such as a battery has been found to provide sufficient reverse biasing current. See, for example, U.S. Pat. No. 3,227,954 dated Jan. 4, 1966 to Fichter, Jr.

This arrangement, however, is not useful when the transmitter has more voltage than the battery. This is true, for example, in certain mobile communication systems where weight and space restrictions preclude the use of high voltage batteries. To provide the required voltage, it has been proposed that the magnitude of the RF signal energy be adapted to maintain the diode in a reverse biasing or nonconducting state. This approach, however, does not account for power losses in the circuit or for surges in power at the antenna. See, for example, U.S. Pat. No. 4,637,065 dated Jan. 13, 1987 to Ruppel.

To prevent power surges at the antenna from damaging the receiver, it has been proposed that the surge voltage be used to reverse bias the receiver diode, thereby decoupling the receiver from the antenna. The surge voltage is so used when it exceeds a predetermined standard. As with Ruppel, this approach does not account for circuit losses. See, for example, U.S. Pat. No. 4,525,863 dated June 25, 1985 to Stites.

Accordingly, it is an object of the present invention to provide an electronic switch that obviates the problems of the prior art and that is able to be used where the transmitter voltage far exceeds the switch's biasing voltage.

It is another object of the present invention to provide an electronic switch that combines in one circuit the ability to obtain a bias voltage directly from the RF power signal and to protect the receiver from possible overload.

It is yet another object of the present invention to provide an electronic switch that uses a voltage increaser to provide the bias voltage from the RF power signal.

It is a further object of the present invention to provide an electronic switch that uses a voltage doubler to protect the receiver circuit by doubling the input signal to reverse bias the receiver diode whenever a power detector circuit detects an overload condition.

These and many other objects and advantages will be readily apparent to one skilled in the art to which the invention pertains from a perusal of the claims, the appended drawings, and the following detailed description of preferred embodiments.

THE DRAWINGS

DETAILED DESCRIPTION OF PREFERRED EMBODIMENTS

Figure 1:
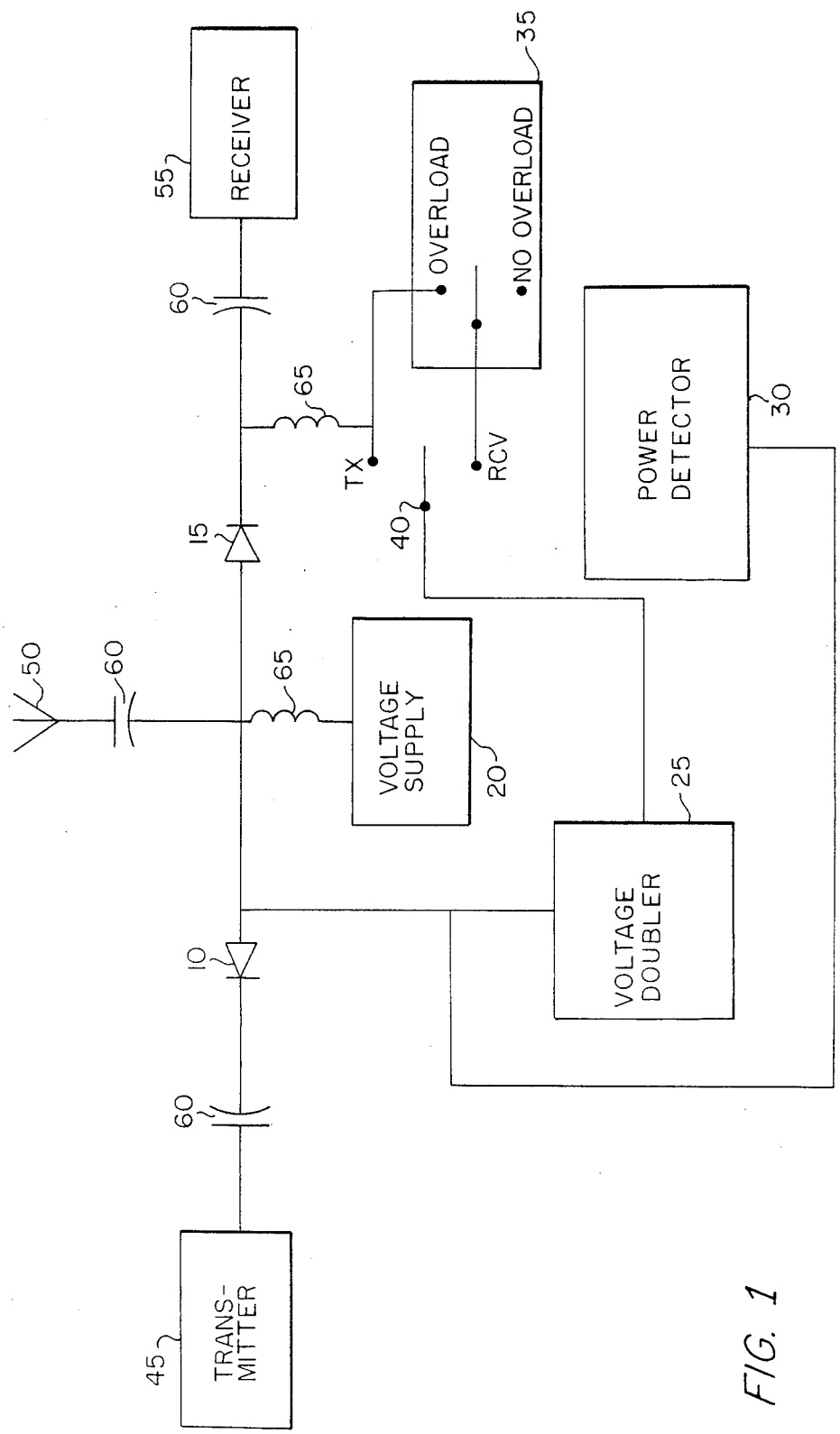
FIG. 1 is a partial block and partial schematic diagram of an embodiment of the switch of the present invention.

With reference to FIG. 1, the switch of the present invention may include a pair of oppositely poled diodes 10 and 15, a low voltage power supply 20 connected between diodes 10 and 15 to provide a forward biasing voltage thereto, a voltage doubler 25 and a power detector 30 also connected between the diodes 10 and 15, power selector 35 for overload protection, and T/R selector 40 responsive to a transmit or receive selection in a communication system. The switch of the present invention may be connected to a communication system's RF transmitter 45, RF antenna 50 and RF receiver 55.

The operation of the switch of the present invention is discussed with further reference to FIG. 1. When the switch is connected to a communication system and the system's transmitter is transmitting, the transmitter diode 10 is forward biased by power supply 20. When the diode 10 is forward biased, it has a very low impedance to RF current and allows RF current from the transmitter to reach the antenna. The transmitter's RF current also is routed to voltage doubler 25 where its voltage may be doubled. The doubled voltage flows through the transmit side of T/R selector 40 to diode 15 where it provides a reverse biasing voltage. When the diode 15 is reverse biased, it has a very high impedance to RF current and thus prevents the transmitter's RF current from reaching the receiver. The reverse biasing voltage provided to diode 15 is always sufficient to block the RF current because the reverse biasing voltage is twice the voltage of the RF current.

When the communication system is set to receive RF signals and the antenna is receiving an RF signal, the receiver diode 15 is forward biased by the power supply 20, allowing RF current at the antenna to reach the receiver. When a power surge at the antenna, such as an electromagnetic pulse or lightning surge, is detected by power detector 30, power selector 35 connects the voltage doubler 25 to diode 15 using the receive side of T/R selector 40. As described above in relation to transmit operations, the diode 15 is reverse biased using a voltage that is double the voltage of the power surge. Thus, power surges at the antenna 50 are isolated from the receiver 55.

Capacitors 60 may isolate direct currents from the antenna, transmitter and receiver. Inductors 65 may isolate the RF current from ground.

Voltage doubler 25 may be any known device for increasing voltage. It is to be understood that while a voltage doubler is preferred, the voltage may be increased by a smaller or greater amount. For example, the voltage may be increased by as little as slightly more than one times the input, or up to the limits of the voltage breakdown of the diodes and transistors.

The power detector 30 may be any known device for detecting power surges above a predetermined value. (See, for example, the automatic override circuit in Stites, supra).

The low voltage power supply may be any known device such as a battery. It is desirable that for a transmitter of approximately 125 watts that the power supply provide about eight volts. Lower voltages, for example three volts, could be used provided there is sufficient voltage to forward bias the diodes.

The transmitter 45, antenna 50, and receiver 55 may be any traditional radio communication system, but the switch is particularly adaptable to mobile communication systems. By appropriate choice of components, the switch of the present invention may be used with communication systems having any output level.

Figure 2:
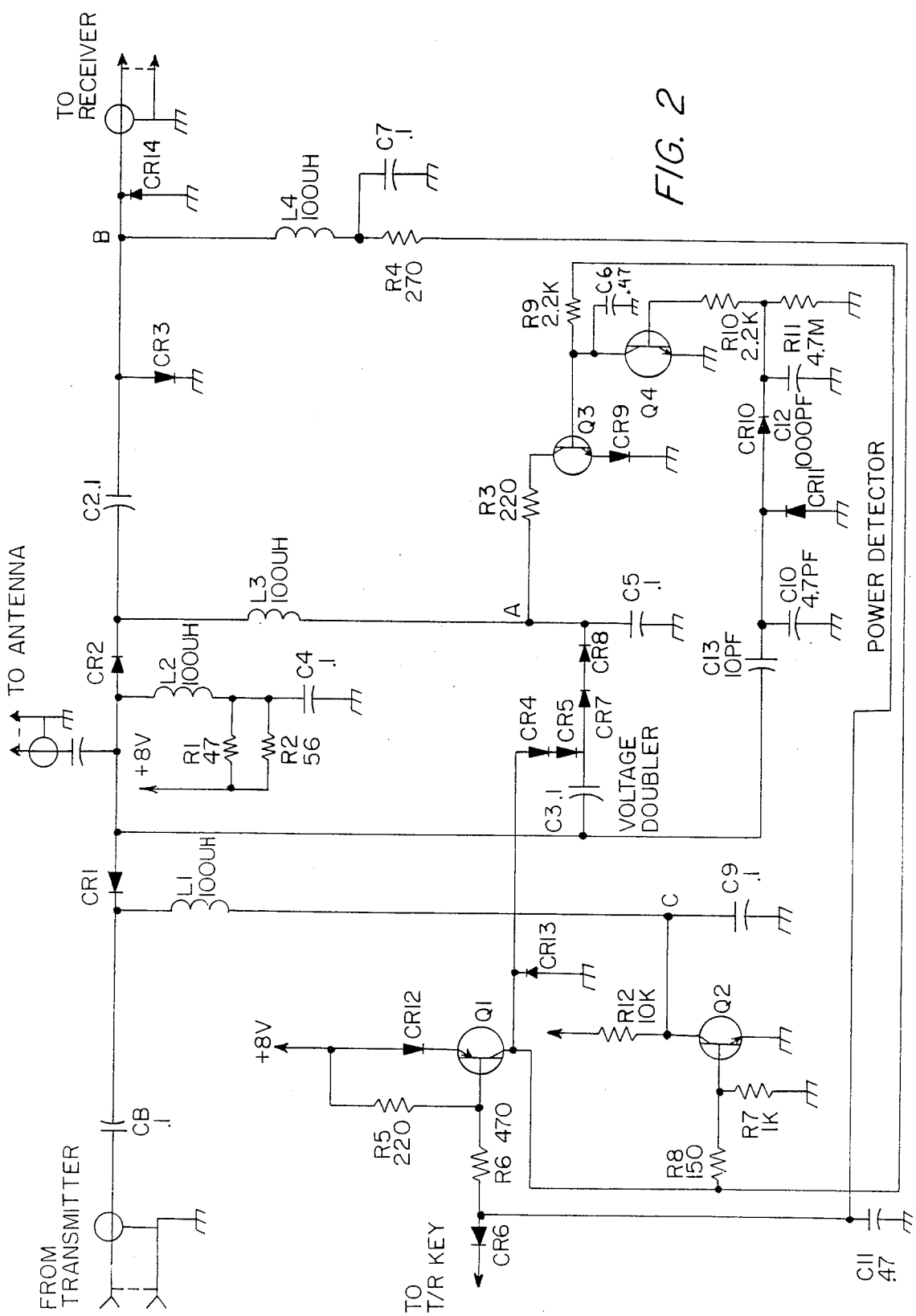
FIG. 2 is an electrical circuit diagram of another embodiment of the switch of the present invention.

With reference now to FIG. 2, another embodiment of the present invention may include diodes CR 1-14, capacitors C 1-13, resistors R 1-12, inductors L 1-4 and transistors Q 1-4. As with the first embodiment described above, when the transmitter is transmitting, diode CR 1 is forward biased by the 8 volt switch power supply through inductor L 2. The voltage of the transmitter's RF current is doubled in the voltage doubler circuitry and provides a reverse bias to diode CR 2 to prevent the transmitter's RF current from reaching the receiver. By way of further explanation, the DC voltages in the switch of the present embodiment operating with a transmitter transmitting with 125 watts of power are; at point A, 250 V DC; point B, 0.7 V DC; and point C, 0.2 V DC.

When the receiver is set to receive, diode CR 2 is forward biased by the switch power supply allowing RF current from the antenna to reach the receiver. Voltages related to power surges are doubled and fed to diode CR 2 through the power detector circuitry. When receiving typical DC voltages may be 6.5 V DC at point A, 0.0 V DC at point B, and 7.8 V DC at point C.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a perusal hereof.

We claim:

1. A solid-state switch for alternatively coupling and decoupling a receiver to an antenna connected to a transmitter comprising:
   (a) a first selective conducting means for coupling said receiver to said antenna responsive to relatively low forward biasing voltage and for decoupling said receiver from said antenna responsive to relatively high reverse biasing voltage;
   (b) a low voltage supply connected to said first selective conducting means for providing said relatively low forward biasing voltage;
   (c) voltage detection means connected to said antenna for identifying relatively high voltage thereon; and
   (d) voltage increasing means for increasing the voltages from said transmitter and said antenna and for providing said increased voltage to said first selective conducting means as said relatively high reverse biasing voltage when said transmitter is transmitting and when said voltage detection means identifies relatively high voltage.

2. The device as defined in claim 1 wherein said voltage increasing means comprises a voltage doubler.

3. A solid-state circuit for selectively coupling and decoupling a receiver to an antenna connected to a transmitter having a relatively high voltage output comprising:
   (a) a relatively low voltage power supply;
   (b) voltage increasing means for increasing the voltage provided to it;
   (c) mean connected to said antenna for detecting a power surge on said antenna, and for providing the voltage of said power surge to said voltage increasing means in response to a power surge detection;
   (d) means for providing the voltage from said transmitter to said voltage increasing means when said transmitter is transmitting; and
   (e) a first selective conducting means capable of being forward biased by said low voltage power supply for coupling said receiver to said antenna, and capable of being reverse biased by said voltage increasing means for decoupling said receiver from said antenna.

4. A solid-state switch for alternately switching an antenna to a transmitter or a receiver in which the biasing voltages are not limited to the voltage of the switch power supply, comprising:
   (a) multiplier means for increasing the voltage output of said transmitter when said transmitter is transmitting so that the output voltage of said multiplier means is greater than the voltage output of said transmitter;
   (b) first selective conducting means for coupling said receiver to said antenna in response to forward biasing voltage from said switch power supply, and for decoupling said receiver from said antenna in response to reverse biasing voltage from said multiplier means; and
   (c) second selective conducting means for coupling said transmitter to said antenna in response to forward biasing voltage from said power supply when said transmitter is transmitting.

5. In a solid-state circuit for alternatively coupling a receiver and a transmitter to an antenna using selective conducting means connected between said receiver and said antenna, the improvement comprising:
   means for increasing the voltage of a signal from said transmitter;
   means for using said increased transmitter voltage to reverse bias said selective conducting means so that said receiver is decoupled from said antenna when said transmitter is transmitting.

6. In a solid-state circuit for alternatively coupling a receiver and a transmitter to an antenna using selective conducting means connected between said receiver and said antenna, the improvement comprising:
   means connected to said antenna for detecting power surges on said antenna;
   means for increasing the voltages of a signal from said transmitter and of said power surges;
   means for using said increased voltages to reverse bias said selective conducting means so that said receiver is decoupled from said antenna when said transmitter is transmitting and when said power surges are detected.

7. The circuit as defined in claim 6 wherein said voltage increasing means comprises a voltage doubler.

* * * * *